(12) United States Patent
Übelein et al.

(10) Patent No.: US 7,615,944 B2
(45) Date of Patent: Nov. 10, 2009

(54) CONTROL SYSTEM FOR WINDOW LIFTERS OF A MOTOR VEHICLE

(75) Inventors: Jörg Übelein, Grub am Forst (DE); Bertram Bopp, Bamberg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 11/479,856

(22) Filed: Jun. 29, 2006

(65) Prior Publication Data
US 2007/0013324 A1 Jan. 18, 2007

(30) Foreign Application Priority Data
Jun. 29, 2005 (DE) .................. 20 2005 010 174 U

(51) Int. Cl.
*G05B 5/00* (2006.01)
*G06F 17/00* (2006.01)

(52) U.S. Cl. .................. 318/266; 318/264; 318/443; 318/466; 701/49

(58) Field of Classification Search .................. 318/34, 318/466, 256, 283, 443, 264, 281, 467, 266; 701/49; 49/502; 307/10.1
See application file for complete search history.

(56) References Cited

U.S. PATENT DOCUMENTS

| | | | | |
|---|---|---|---|---|
| 4,347,465 A * | 8/1982 | Goertler et al. ............. | 318/266 |
| 5,054,686 A | 10/1991 | Chuang | |
| 5,081,586 A * | 1/1992 | Barthel et al. ............. | 701/49 |
| 5,129,192 A * | 7/1992 | Hannush ............. | 49/349 |
| 5,187,381 A * | 2/1993 | Iwasa et al. ............. | 307/10.1 |
| 5,585,702 A * | 12/1996 | Jackson et al. ............. | 318/266 |
| 5,585,705 A * | 12/1996 | Brieden ............. | 318/467 |
| 5,689,160 A * | 11/1997 | Shigematsu et al. ............. | 318/281 |
| 5,734,245 A * | 3/1998 | Terashima et al. ............. | 318/453 |
| 6,253,135 B1 * | 6/2001 | Hubacher ............. | 701/49 |
| 6,281,647 B1 * | 8/2001 | Sasaki ............. | 318/264 |
| 6,541,929 B2 * | 4/2003 | Cregeur ............. | 318/283 |
| 6,748,308 B2 | 6/2004 | Losey | |
| 6,952,087 B2 * | 10/2005 | Lamm ............. | 318/283 |
| 7,071,637 B2 * | 7/2006 | Mersch ............. | 318/62 |
| 2002/0105295 A1 * | 8/2002 | Cregeur ............. | 318/283 |
| 2002/0190679 A1 * | 12/2002 | Lamm ............. | 318/443 |
| 2004/0095084 A1 * | 5/2004 | Mersch ............. | 318/62 |
| 2006/0208676 A1 * | 9/2006 | Adachi et al. ............. | 318/256 |
| 2006/0291109 A1 * | 12/2006 | Wang ............. | 361/5 |
| 2007/0084128 A1 * | 4/2007 | Recknagel et al. ............. | 49/502 |

FOREIGN PATENT DOCUMENTS

| | | |
|---|---|---|
| DE | 43 02 143 A1 | 7/1994 |
| DE | 4416803 A1 * | 11/1994 |
| DE | 102 08 323 A1 | 11/2002 |
| DE | 102 53 643 A1 | 5/2004 |

* cited by examiner

*Primary Examiner*—Paul Ip
(74) *Attorney, Agent, or Firm*—White & Case LLP

(57) ABSTRACT

A control system for a first window lifter adjusts a first window pane of a motor vehicle having a first drive, and for a second window lifter for adjusting a second window pane of the motor vehicle having a second drive, having a control device. The control device may be electrically connected both to the first drive and to the second drive for the purpose of energization. The control device may have a first sensor for determining a first adjustment position of the first window lifter, and a second sensor for determining a second adjustment position of the second window lifter, the first sensor and the second sensor being based on different physical operational principles.

36 Claims, 3 Drawing Sheets

U.S. Patent    Nov. 10, 2009    Sheet 3 of 3    US 7,615,944 B2

CONTROL SYSTEM FOR WINDOW LIFTERS OF A MOTOR VEHICLE

FIELD OF INVENTION

The invention relates to a control system for window lifters of a motor vehicle.

BACKGROUND OF INVENTION

Window lifters in motor vehicles serve to adjust the position of a window pane within a vehicle bodywork, within a swing door, within a tailgate or within a sliding door. In order, for example, to obtain a desired speed profile, a motor current of a drive of the window lifter is controlled by means of a power driver, for example a power semiconductor. Furthermore, it is desirable to sense the position of the window pane in order to control the adjustment movement and/or a collision protection means as a function of the sensed position.

An example of a window lifter having a drive is described in German laid-open patent application DE 43 02 143 A1. In this window lifter, the drive motor has a rotor which can be displaced axially. When the drive current for the drive motor is switched off, the rotor is moved into a locked position as a result of which the drive motor and thus the drive as a whole can be blocked.

DE 102 53 643 A1 is based on the basic idea of preventing a plurality of window lifters simultaneously closing completely the window pane assigned to them. Instead, only the window lifter which first closes the window pane is allowed to close the window pane to an extent at which the window lifter motor is blocked and the blocking current flows. All the other window lifter motors are switched off with timing such that the window pane does not reach its completely closed position, but rather only an approximately closed position. As soon as a window pane enters this end region, a blocking signal is emitted by a control unit of the corresponding window lifter and is transmitted via a bus system to all the other control units of the window lifters.

U.S. Pat. No. 6,253,135 B1 discloses a method for controlling a plurality of window lifters of a motor vehicle. DE 102 08 323 A1 relates to a motor-operated window system for a vehicle. The motor-operated window system comprises a window which can move between an open position and a closed position. The motor-operated window system also comprises a motor which is coupled to the window, the motor selectively causing the window to move. The motor-operated window system also comprises at least one switch and a communications bus which is coupled to the motor. The motor-operated window system also comprises a processor that is connected at least to the switch or the communications bus and is designed to selectively transmit at least one closing signal or opening signal to at least the switch or the communications bus. The motor-operated window system also comprises a sensor which is connected to the processor and which senses states on which automatic closing of the window is based.

SUMMARY OF INVENTION

The invention is based on the object of specifying a control system which is particularly suitable for window lifters of a motor vehicle, and in particular is adapted to specifications in automobile engineering while being of as simple a design as possible.

This object is achieved by means of a control system having the following features: a control system for a first window lifter for adjusting a first window pane of a motor vehicle having a first drive, and for a second window lifter for adjusting a second window pane of the motor vehicle having a second drive, having a control device; the control device being electrically connected both to the first drive and to the second drive for the purpose of energization; the control device having a first sensor for determining a first adjustment position of the first window lifter, and a second sensor for determining a second adjustment position of the second window lifter; the first sensor and the second sensor being based on different physical operational principles. This object is also achieved by means of a control system having the following features: a control system for a first adjustment device for adjusting a first adjustable part of a motor vehicle having a first drive, and for a second adjustment device for adjusting a second adjustable part of the motor vehicle having a second drive, having a control device; the control device being electrically connected both to the first drive and to the second drive for the purpose of energization; the control device having a first sensor for detecting a first collision of the first adjustable part and a second sensor for detecting a second collision of the second adjustable part; the first sensor and the second sensor being based on different physical operational principles. Advantageous developments are also the subject matter of dependent claims set forth below.

Accordingly, a control system is provided for a first window lifter for adjusting a first window pane of a motor vehicle and for a second window lifter for adjusting a second window pane of the motor vehicle. The control system has a first drive for adjusting the first window pane. The drive preferably has a mechanically commutated or electrically commutated electric motor and advantageously a gear mechanism which is operatively connected to the mechanics of the window lifter in order to adjust the window pane between an open position and a closed position by means of electromotive force.

In addition, the control system has a second drive which also permits the second window pane to be adjusted by means of electromotive force. Furthermore, the control system has a control device which is electrically connected both to the first drive and to the second drive for the purpose of energization. The control device is preferably an electric circuit which is constructed of a plurality of components and advantageously has a power driver, for example a relay, for driving drive currents.

The control device has a first sensor for determining a first adjustment position of the first window lifter and a second sensor for determining a second adjustment position of the second window lifter. The sensing of the adjustment position is advantageously indirect so that the position of the window pane is not sensed but rather a movement of an element which is connected to the adjustment movement of the window pane is sensed, in particular a rotational movement of a shaft or of an electric motor. The two sensors preferably sense a rotational movement that is dependent on a movement of the respective drive.

The first sensor and the second sensor are based on different physical operational principles. A sensor for determining the adjustment position may be based, for example, on an optical, capacitive, magnetic, resistive or contact operational principle.

Furthermore, the object according to the invention is achieved by means of a control system which is configured to perform control processes for a first adjustment device for adjusting a first adjustable part of a motor vehicle having a first drive, and for a second adjustment device for adjusting a second adjustable part of the motor vehicle having a second drive. The first adjustable part is, for example, a motor vehicle window pane, while the second adjustable part is, for example, a sun roller blind or a sliding door. The sun roller blind or the motor vehicle window pane is advantageously arranged in the same motor vehicle door, preferably in the sliding door of the motor vehicle.

The control system has a control device. The control device is electrically connected both to the first drive and to the second drive for the purpose of energization. The control device has a first sensor for detecting a first collision between the first adjustable part and a trapped object and/or for determining an adjustment position of the first adjustable part, and a second sensor for detecting a second collision between the first adjustable part and a trapped object, and/or for determining an adjustment position of the second adjustable part. The first sensor and the second sensor are based here on different physical operational principles.

The first sensor is preferably configured to sense a drive movement of the first drive, and the second sensor is configured to sense a drive movement of the second drive. The control device is advantageously configured for indirect detection of an impact by determining trapping forces acting on the drive in that, for example, a braking effect which is brought about on the respective drive by the collision is sensed and evaluated.

In order to very largely integrate electronics of the control device, in one advantageous embodiment variant of the invention there is provision for the first sensor and the second sensor to be arranged on a single circuit carrier, in particular on a single printed circuit board of the control device. A circuit carrier permits attachment of the sensors and further components and electrical connection by means of, for example, metallic conductor tracks made of copper. As an alternative to a dimensionally rigid or flexible printed circuit board (circuit board) made, for example of plastic, resin or ceramic, it is also possible to use a circuit carrier in the form of a lead frame which is encapsulated with an insulating plastic by injection molding.

According to one preferred development there is provision for the first sensor to sense a rotational movement of the first drive. For this purpose, a rotationally movable drive element, for example a shaft of an electric motor, has a sensor, for example an optical reflector. The second sensor senses, on the other hand, a signal which has been modulated onto a drive current and/or onto a drive voltage of the second drive. The modulation is preferably provided here by the rotational movement of the electric motor of the second drive, advantageously by its mechanical commutation. The second sensor is configured here for demodulation by virtue of the fact that it advantageously has a resistor (shunt) or a coil.

In one refinement there is provision for the first sensor to be based on a magnetic operational principle and the second sensor is based on an electrically resistive operational principle. The first sensor is advantageously a Hall sensor which is operationally connected to a magnet which is moved by a drive movement of the first drive in order to sense the drive movement. The second sensor is advantageously a resistor across which a motor current of the second drive flows. Such a resistor is referred to as a shunt resistor. In this context, an arrangement of the shunt resistor remote from the drive is possible so that the drive movement of the second drive can be provided by the control device itself remotely measuring the voltage of the second drive which drops across the shunt resistor.

The control device is preferably arranged with the first drive in a first motor vehicle door, and the second drive is arranged outside the first motor vehicle door. The second drive is arranged, for example, in an area of the bodywork or in a second motor vehicle door. In one advantageous refinement variant, the control device is configured together with the first drive as one assembly which can be pretested and installed in one assembling step.

In one preferred development, the control device has a first power driver for controlling a first drive current of the first drive, and a second power driver for controlling a second drive current of the second drive. A power driver is, for example, a relay or a power semiconductor such as a field effect transistor.

The control device preferably has a computing unit which is connected to the first sensor and to the second sensor. The computing unit is advantageously a microcontroller or a user-specific circuit (ASIC). At least parts of the computing unit are advantageously integrated with the power drivers on one semiconductor chip as what is referred to as a smart power unit. Alternatively or in combination at least one of the two sensors is advantageously integrated with the computing unit in a component housing.

In one preferred development there is provision for the computing unit to be designed to detect a first collision of the first window pane with an object or body part within a first adjustment path of the first window lifter as a function of sensor signals of the first sensor, and to detect a second collision of the second window pane with an object or body part within a second adjustment path of the second window lifter as a function of sensor signals of the second sensor. The signals of the first sensor and of the second sensor are evaluated here in order to determine a collision.

If both drives are moved simultaneously, the computing unit is also designed to carry out parallel evaluation of both sensor signals so that in the case of a collision at least one of the two drives is stopped and, if appropriate, energized so as to reverse in the opposite direction. The computing unit is therefore preferably designed to control a simultaneous adjustment process of the first drive and of the second drive. The measured signals of the two sensors are advantageously read into the computing unit here and assigned to the respective adjustment movement.

In one embodiment variant, the control device is integrated into a housing, in particular into a gear mechanism housing of the first drive or into an electronic housing which is attached to an opening region in the gear mechanism housing. In this context, the control device has an electric terminal for the second drive. The electric terminal is, for example, a plug for a cable harness of a motor vehicle which contains two electric cables leading to the second drive.

According to one development, the control device is connected via a bus, in particular a CAN bus or a LIN bus, to a further electrical device of the motor vehicle. For example, this further electrical device is a central control unit of the motor vehicle. This further electrical device is, however, preferably a further control device which is designed to energize a third window lifter drive, and advantageously also a fourth window lifter drive.

BRIEF DESCRIPTION OF THE DRAWINGS

The invention is explained in more detail below using exemplary embodiments and with reference to drawings, in which.

DETAILED DESCRIPTION

Figure 1:
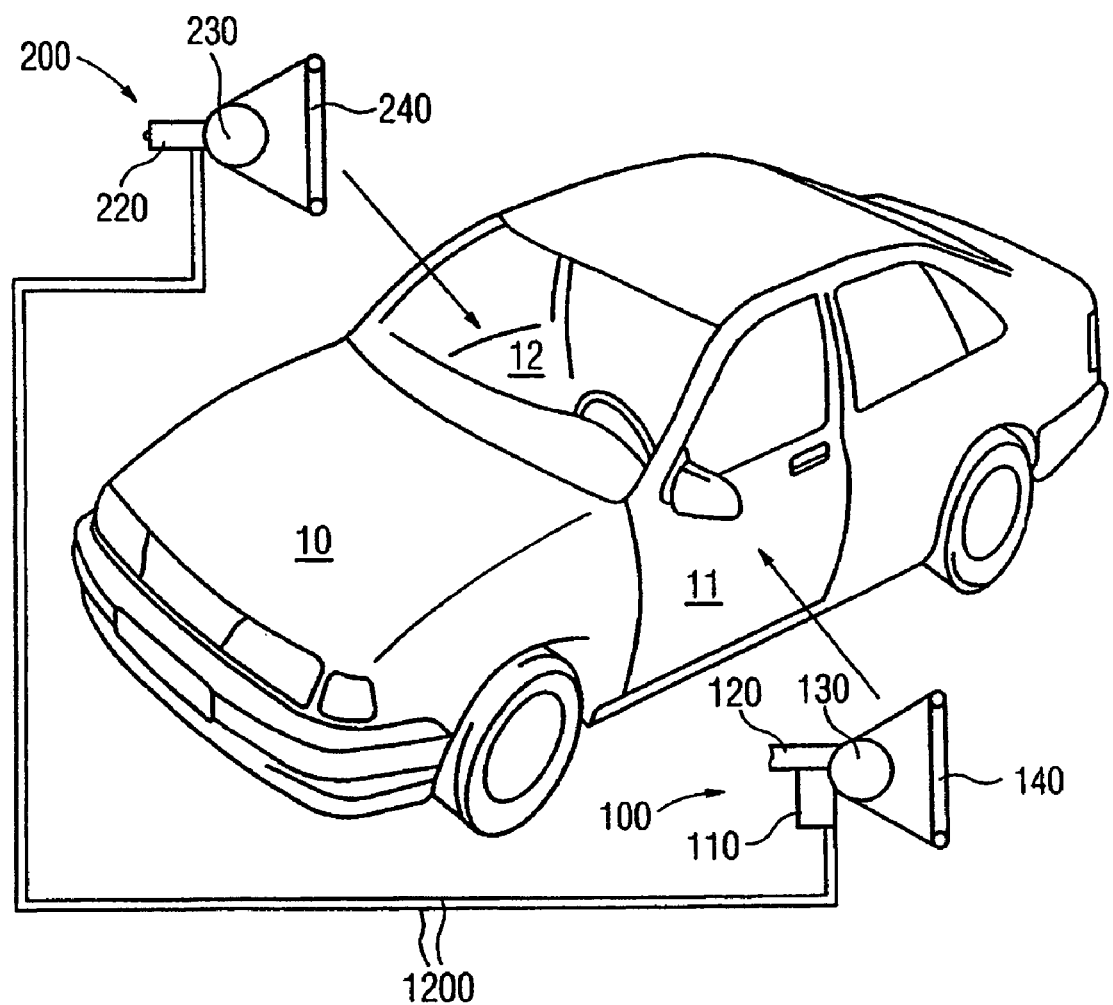
FIG. 1 shows a motor vehicle with two window lifters illustrated in exploded views.

A first exemplary embodiment is illustrated in FIG. 1. In this exemplary embodiment, a motor vehicle 10 has merely one vehicle door 11 and a front seat passenger door 12. In contrast, this so-called two doorer does not have any rear swing doors. The rear window panes are either nonmovable or can be adjusted manually by a manual window lifter (not illustrated), for example by means of a crank.

The window panes of the front doors 11 and 12 are, in contrast, mechanically coupled to, in each case, a window lifter 140 or 240. The window lifter mechanism is in turn connected mechanically to a drive 100 or 200. The respective window pane can therefore be adjusted between an open position and a closed position, and can also be adjusted into any desired intermediate position, with electromotive force by means of the drive 100, 200.

For this purpose the drive 100, 200 has an electric motor 120, 220 and a gear mechanism housing 130, 230 with a gear mechanism. A control device 110 is provided both for controlling a first drive current through the first drive motor 120 and for controlling a second drive current through the second drive motor. The control device has electronic components for the purpose of control. In this context, the control device is conductively connected to a power terminal of the first electric motor 120, and to a power terminal of the second electric motor 220 via an at least two-conductor cable 1200.

This provides the advantage that, depending on the installation point of the respective window lifter motor, it is possible to use different sensor triggering possibilities in an optimized way. In door control units which are integrated into the motor, the principle of the Hall sensor system is particularly easy and thus cost effective. If, on the other hand the installation point of the window lifter motor is remote with respect to the door control unit, the modulation of a signal onto the motor current is, in contrast, more favorable since it is not necessary to lay any additional lines for a sensor. The use of different operational principles of the sensors permits simple and thus cost effective integration of different sensors into a housing. Furthermore, the use of sensors which are based on different operational principles provides the further advantage that this combined use of different sensors allows the sensors to be selected in order to optimize the processor load. For example, owing to the smaller number of computational steps a Hall sensor requires a lower processor load than is required to evaluate current ripples of a drive which is arranged remotely. Accordingly, the same processor can simultaneously both evaluate the current ripples and the Hall signal edges of a Hall sensor which are easier to evaluate, with the result that it is not necessary to use an over-dimensioned microcontroller.

Figure 2:
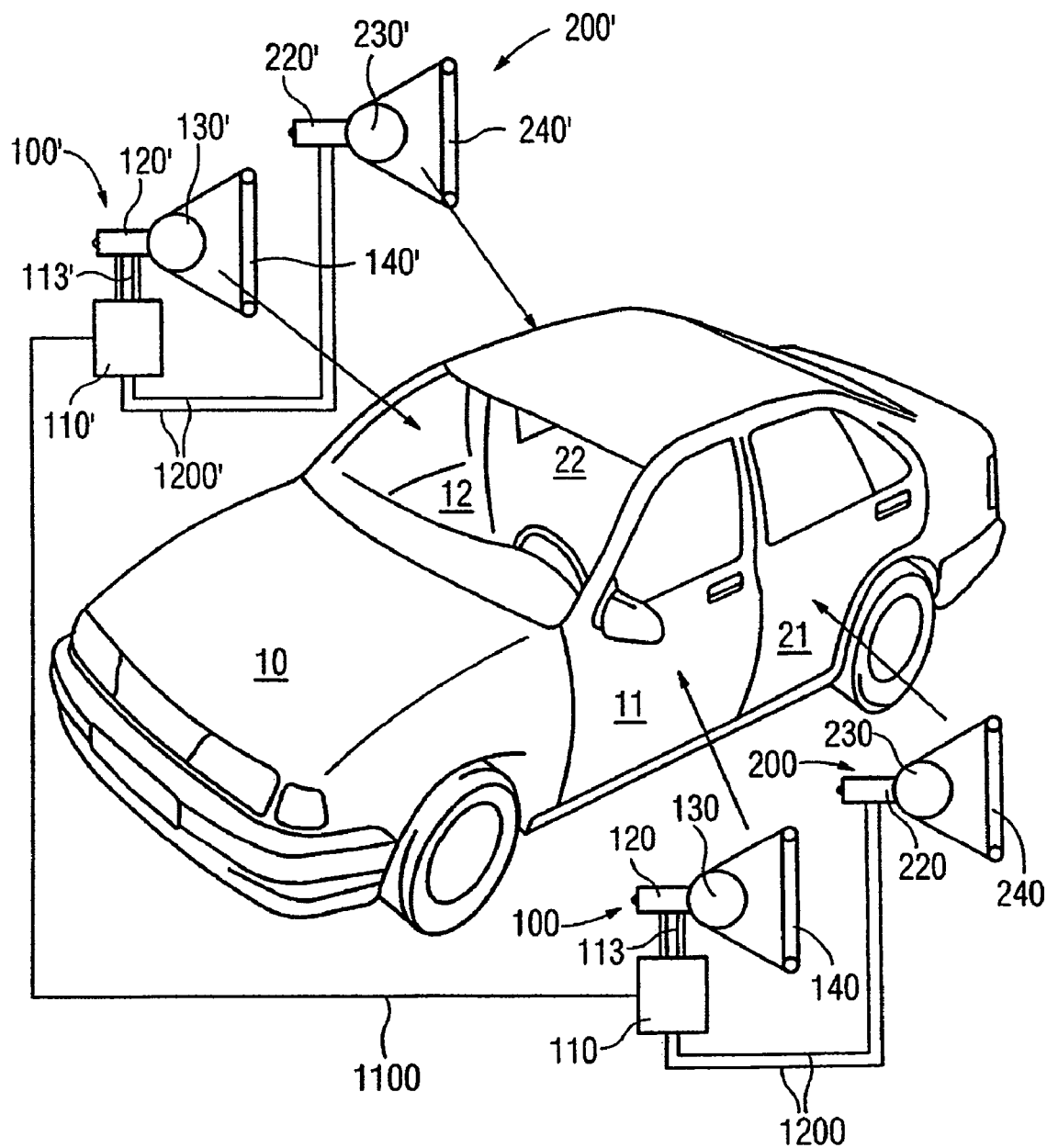
FIG. 2 shows a motor vehicle with four window lifters illustrated in exploded views.

FIG. 2 shows a second exemplary embodiment. In this exemplary embodiment in FIG. 2, the motor vehicle 10 has two rear swing doors 21 and 22 in addition to the driver's door 11 and front seat passenger's door 12. Each door 11, 12, 21, 22 has a window lifter 140, 240, 14' and 240'. A control device 110 is arranged in the driver's door 11 and also controls the rear door 21 on the driver's side by means of an at least two-conductor cable 1200. Analogously, a further control device 110' is arranged in the front seat passenger's door and also controls the rear door 22 on the front seat passenger's side by means of an at least two-conductor cable 1200'.

The control device 110 and the further control device 110' are operatively connected to one another via a CAN bus link 1100 in the motor vehicle 10. The control device 110 preferably has an operator control device, in which case (remote) adjustment of a window pane on the front seat passenger's side is also possible by means of at least one operator control element.

The control device 110 is connected to the drive 100 via an electronics/motor interface 113. This electronics/motor interface 113 is configured here to transmit a sensor signal and to transmit the motor current between the control device 110 and the drive 100. For this purpose the interface 113 has four or more electrical and/or magnetic lines. The same applies to the electronics/motor interface 113' between the further control device 110' and the further drive 100'.

Figure 3:
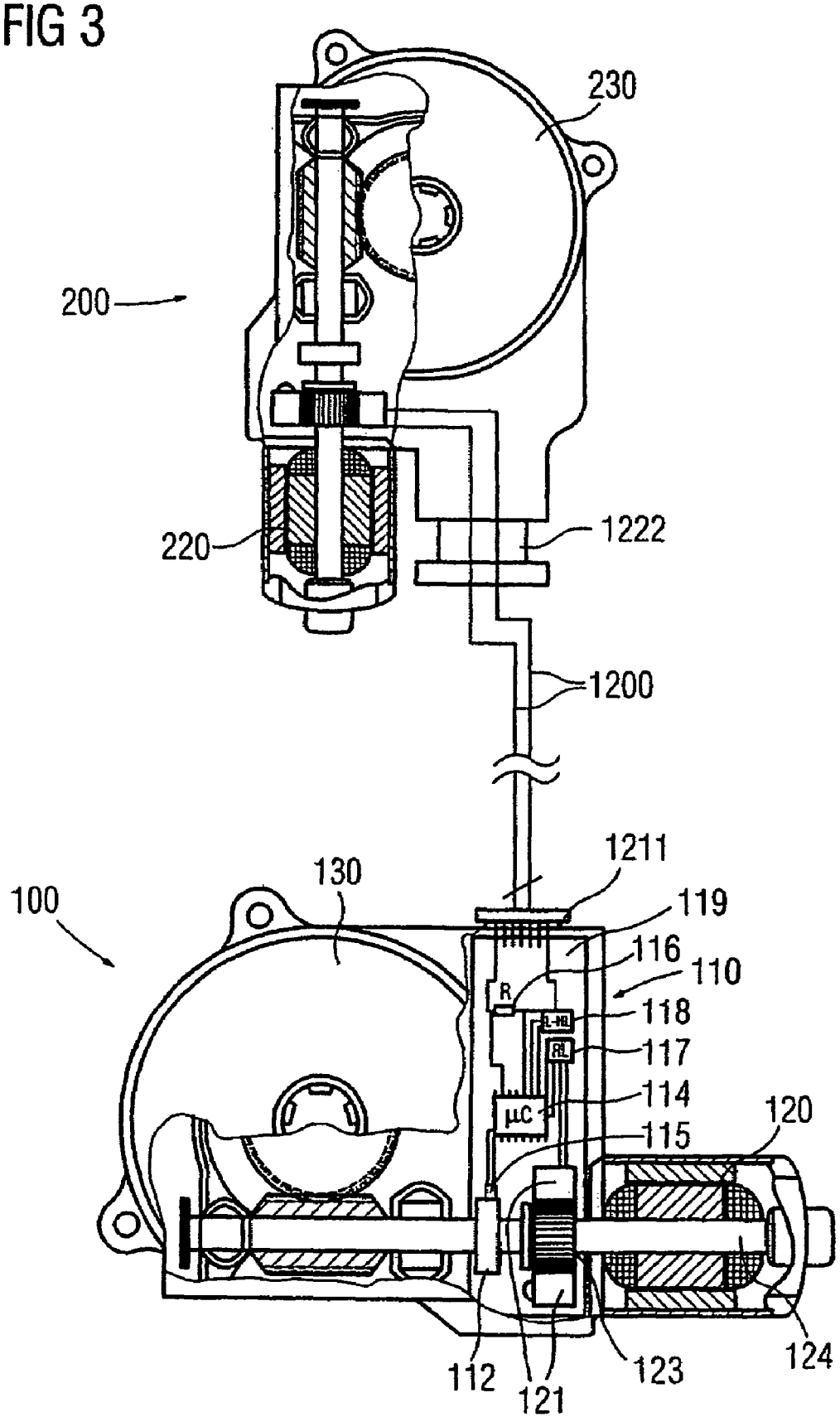
FIG. 3 shows a first drive and a second drive for a window lifter.

As an alternative to an electronics/motor interface 113 by means of cable, FIG. 3 is a schematic illustration of an integrative exemplary embodiment. A rectangular circuit board 119 of the control device 110 is inserted into the gear mechanism housing 130 of the first drive 100 and latched in place. The control device 110 has for this reason a plug connection 1211 which is integrated into the gear mechanism housing 130 and by means of which the second drive 200 is electrically connected to the control device 110 via a cable 1200 and via a further plug 1222 in the second gear mechanism housing 230 of the second drive 200.

In order to energize the first electric motor 120, two brush holders each with a secured brush 121 are soldered onto the circuit board 119. For the purpose of energization, the brushes interact here with a commutator 123 of the electric motor 120. The brushes 121 are connected to a relay 117 via electrical copper lines of the circuit board 119. For the purpose of control, the relay 117 is connected to a microcontroller 114 and can be actuated by it. Furthermore, a further power switch in the form of a power field effect transistor 118 is provided on the circuit board and is also connected to the microcontroller 114 in order to control the drive current of the second drive 200.

Furthermore, a first sensor 115 and a second sensor 116 are soldered onto the circuit board 119 of the control device 110 and are connected to the microcontroller 114 in order to evaluate the sensor signals. The first sensor 115 is operatively connected to the first drive 100 in order to sense a first adjustment position of the first window lifter 140. For this purpose, a ring magnet 112 which has a number of magnetic poles which, through a rotational movement of the motor shaft 124, generate a magnetic field of alternating polarity in the first sensor which is designed as a Hall sensor 115 is mounted on a motor shaft 124 of the first electric motor 120. The physical operational principle of this first sensor 115 is therefore magnetism.

The second sensor 116 is intended to determine the adjustment position of the second window pane which is connected to the second drive 200. The second sensor 116 is a measuring resistor 116 with a value of several milli ohms. Therefore, the physical operational principle on which the measuring resistor 116 is based is an electrically resistive operational principle. The motor current through the second drive 200 therefore flows via the measuring resistor 116, via the power field effect transistor 118 as power driver, and an electrical connection 1211, 1200 and 1222 to the motor 220. The electrical connection 1211, 1200 and 1222 can therefore be a component of a relatively complex cable harness (not illustrated in the figures) of the motor vehicle 10.

In order to determine an adjustment position of the window lifter that is driven by the second drive 200, use is made, for example of a method for determining the rotational speed and/or the rotational angle in mechanically commutated direct current motors from the time profile of the ripple occurring during commutation in the motor current measured with the second sensor 116. The determination is supplemented and monitored here by a motor state model which operates in parallel with this and which is based on the electromechanical motor equations. A probable value of the current rotational speed is extrapolated from the motor current and the motor voltage and a permissible set point value range of the next commutation process is determined. If it is not possible to determine a commutation time in the set point value range, the extrapolated value is used. Otherwise, the current rotational speed is determined precisely from the commutation time sensed in the set point value range. The motor-specific and load-dependent variable which is necessary for the motor state model can be permanently predefined or respectively adapted to the current rotational speed after commutation processes have been detected.

Incorporated by reference herein in their entirety are Germany priority application number 20 2005 010 174.5, filed Jun. 29, 2005, and its certified English language translation, copies of both of which documents are filed herewith.

What is claimed is:

1. A control system for a first window lifter for adjusting a first window pane of a motor vehicle having a first drive, and for a second window lifter for adjusting a second window pane of the motor vehicle having a second drive, the control system comprising:
   a control device electrically coupled both to the first drive and to the second drive for energization of the drives;
   the control device comprising a first sensor for determining a first adjustment position of the first window lifter, and a second sensor for determining a second adjustment position of the second window lifter;
   wherein the first sensor and the second sensor are based on different physical operational principles.

2. The control system according to claim 1, in which the first sensor and the second sensor are arranged on a single circuit carrier.

3. The control system according to claim 2, in which the first sensor and the second sensor are arranged on a single printed circuit board of the control device.

4. The control system according to claim 1, in which the first sensor senses the rotational movement of the first drive, and the second sensor senses a signal which has been modulated onto at least one of the drive current and drive voltage of the second drive.

5. The control system according to claim 1, in which the first sensor is based on a magnetic operational principle and the second sensor is based on an electrically resistive operational principle.

6. The control system according to claim 1, in which the control device is arranged with the first drive as an assembly in a first motor vehicle door, and the second drive, which is controlled by the control device, is arranged remotely from the control device, outside the first motor vehicle door.

7. The control system according to claim 6, wherein the second drive is arranged in a second motor vehicle.

8. The control system according to claim 1, in which the control device further comprises a first power driver for controlling a first drive current of the first drive, and a second power driver for controlling a second drive current of the second drive.

9. The control system according to claim 1, in which the control device further comprises a computing unit which is connected to the first sensor and to the second sensor.

10. The control system according to claim 9, in which the computing unit is designed:
   to detect a first collision of the first window pane with an object or body part within a first adjustment path of the first window lifter as a function of a sensor signal of the first sensor, and
   to detect a second collision of the second window pane with an object or body part within a second adjustment path of the second window lifter as a function of a sensor signal of the second sensor.

11. The control system according to claim 10, in which the computing unit is designed to control a simultaneous adjustment process of the first drive and of the second drive.

12. The control system according to claim 11, wherein the simultaneous adjustment process in an automatic adjustment process.

13. The control system according to claim 9, wherein the computing unit is a microcontroller.

14. The control system according to claim 9, wherein the computing unit is designed to evaluate the first sensor and second sensor simultaneously.

15. The control system according to claim 1, in which the control device is integrated into a housing of the first drive, and in which the control device has an electric terminal for the second drive.

16. The control system according to claim 1, in which the control device is arranged in a separate housing in a door of the motor vehicle, and in which the control device further comprises an electric terminal for the first drive and for the second drive.

17. The control system according to claim 1, in which the control device is connected via a bus to a further electrical device of the motor vehicle.

18. The control system according to claim 17, wherein the further electrical device comprises a second control device for energizing at least a third window lifter drive.

19. A control system for a first adjustment device for adjusting a first adjustable part of a motor vehicle having a first drive, wherein the first adjustable part is a window pane, and for a second adjustment device for adjusting a second adjustable part of the motor vehicle having a second drive, the control system comprising:
   a control device electrically connected both to the first drive and to the second drive for the purpose of energization;
   the control device comprising a first sensor for detecting a first collision of the first adjustable part and a second sensor for detecting a second collision of the second adjustable part; and
   the first sensor and the second sensor being based on different physical operational principles.

20. The control system according to claim 19, in which the first sensor and the second sensor are arranged on a single circuit carrier.

21. The control system according to claim 20, in which the first sensor and the second sensor are arranged on a single printed circuit board of the control device.

22. The control system according to claim 19, in which the first sensor senses the rotational movement of the first drive, and the second sensor senses a signal which has been modulated onto at least one of the drive current and drive voltage of the second drive.

23. The control system according to claim 19, in which the first sensor is based on a magnetic operational principle and the second sensor is based on an electrically resistive operational principle.

24. The control system according to claim 19, in which the control device is arranged with the first drive as an assembly in a first motor vehicle door, and the second drive, which is controlled by the control device, is arranged remotely from the control device, outside the first motor vehicle door.

25. The control system according to claim 24, wherein the second drive is arranged in a second motor vehicle door.

26. The control system according to claim 19, in which the control device further comprises a first power driver for controlling a first drive current of the first drive, and a second power driver for controlling a second drive current of the second drive.

27. The control system according to claim 19, in which the control device further comprises a computing unit which is connected to the first sensor and to the second sensor.

28. The control system according to claim 27, in which the computing unit is designed:
- to detect a first collision of the first adjustable part with an object or body part within a first adjustment path of the first adjustable part as a function of a sensor signal of the first sensor, and
- to detect a second collision of the second adjustable part with an object or body part within a second adjustment path of the second adjustable part as a function of a sensor signal of the second sensor.

29. The control system according to claim 28, in which the computing unit is designed to control a simultaneous adjustment process of the first drive and of the second drive.

30. The control system according to claim 29, wherein the simultaneous adjustment process is an automatic adjustment process.

31. The control system according to claim 27, wherein the computing unit is a microcontroller.

32. The control system according to claim 27, wherein the computing unit is designed to evaluate the first sensor and the second sensor simultaneously.

33. The control system according to claim 19, in which the control device is integrated into a housing of the first drive, and in which the control device has an electric terminal for the second drive.

34. The control system according to claim 19, in which the control device is arranged in a separate housing in a door of the motor vehicle, and in which the control device further comprises an electric terminal for the first drive and for the second drive.

35. The control system according to claim 19, in which the control device is connected via a bus to a further electrical device of the motor vehicle.

36. The control system according to claim 35, wherein the further electrical device comprises a second control device for energizing at least a third window lifter drive.

* * * * *